(No Model.)

C. H. SMITH.
LUGGAGE CARRIER.

No. 402,991.  Patented May 7, 1889.

Attest.
M. M. Wiles
Wm. C. Sprague

Inventor.
Clarence H. Smith,
By John E. Wiles,
his Attorney.

UNITED STATES PATENT OFFICE.

CLARENCE H. SMITH, OF DETROIT, MICHIGAN.

LUGGAGE-CARRIER.

SPECIFICATION forming part of Letters Patent No. 402,991, dated May 7, 1889.

Application filed September 14, 1888. Serial No. 285,371. (No model.)

*To all whom it may concern:*

Be it known that I, CLARENCE H. SMITH, a citizen of the United States, residing at Detroit, county of Wayne, and State of Michigan, have invented certain new and useful Improvements in Luggage-Carriers; and I declare the following to be a full, clear, and exact description of the invention, such as will enable others skilled in the art to which it appertains to make and use the same, reference being had to the accompanying drawings, which form a part of this specification.

My invention relates to improvements in luggage-carriers, and more particularly to that class of luggage-carriers adapted for use upon bicycles.

The objects of my invention are, first, to provide an improved luggage-carrier adapted to be secured upon the handle-bars of a bicycle, and provided with a bracket-support to stiffen the carrier and prevent the same from sagging under the weight of the bundle, and, second, to provide an improved luggage-carrier of such construction that it may be easily and quickly attached to and detached from the bicycle, said carrier being equally adapted for use upon bicycles of various manufactures.

The various features of my invention will be fully described in the following specification, and pointed out in the claim.

Figure 1:
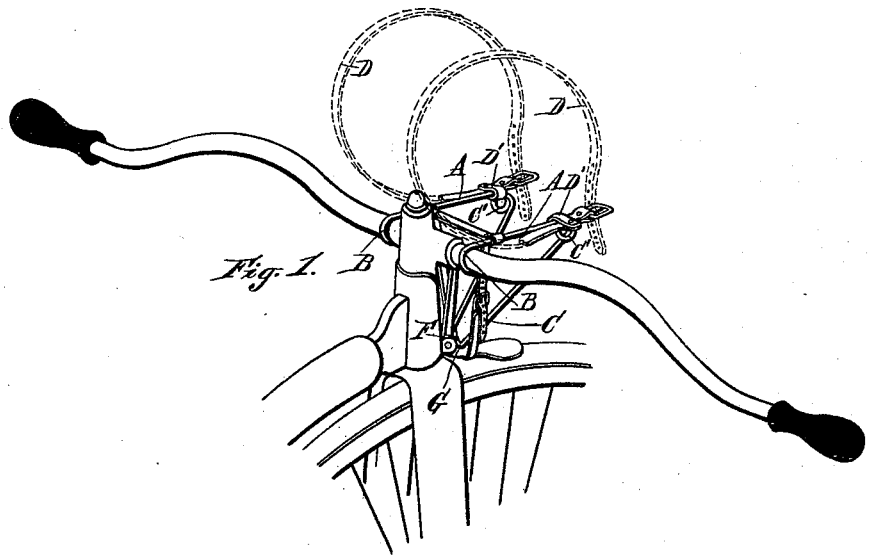
Figure 2:
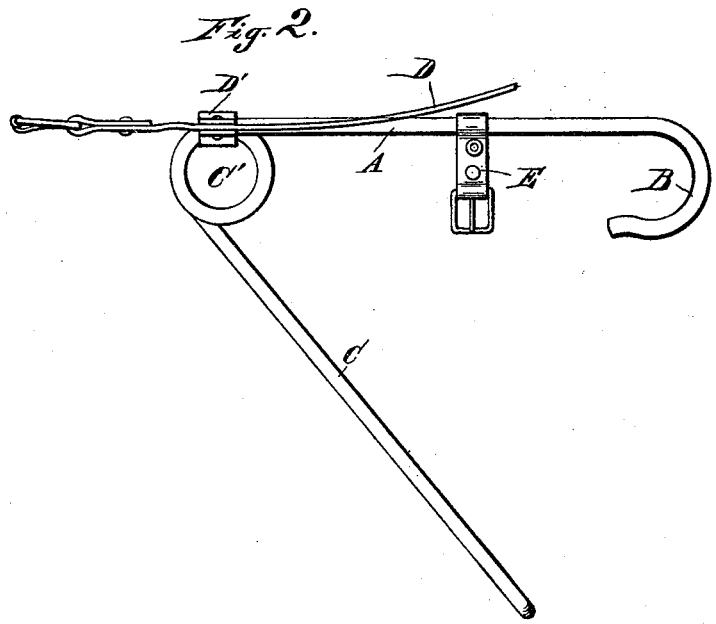

In the accompanying drawings, Figure 1 is a perspective view of my improved carrier attached to the handle-bars of a bicycle. Fig. 2 is a view of the carrier detached from the bicycle.

A represents the horizontal supporting-arms; B, hooks at their ends for engaging the handle-bars; C, bracket-arms for stiffening and supporting the arms A; D, straps for securing the bundle in position; E, a strap passing downwardly and under the brake to bind the carrier firmly upon the bicycle.

F is a depression upon the cross-piece between the bracket-arms adapted to engage the brake and hold the bracket-arms C rigidly in position and prevent their lateral displacement.

I construct my improved luggage-carrier, preferably, of a single continuous piece of wire, as follows: The wire is bent at its middle portion, so as to form two arms of equal length with the intervening cross-piece G. These arms are now bent once around, as shown at C', to form an eye through which the straps D' are passed to form a support for the bundle-straps D. Hooks B are now formed at the extremities of the arms.

The operation of my device is as follows: The wheelman slips the hooks B over the handle-bars, as shown in Fig. 1, and brings the arms C down so as to engage the depression F upon the brake. The strap E may now be passed under the brake and buckled together, as shown, so as to secure the carrier in place. The bundle may now be placed upon the arms A and secured in place by straps D. This, it will be seen, forms a very strong and substantial carrier, capable of sustaining a heavy load without bending out of shape.

In the various styles of luggage-carriers as heretofore made there is no means of supporting the load other than the horizontal arms, the stability of the device depending entirely upon the rigidity of said arms. This has been found in practice to be a very unsatisfactory construction, as the horizontal arms are liable to be bent by the weight of the bundle or the vibration caused by passing over rough roads. With my improvements, however, this objection is entirely overcome, as the bracket-arms C serve effectually to prevent the sagging of the horizontal arms A.

Another great disadvantage in the use of carriers of ordinary construction is that they cannot be readily attached to and detached from bicycles of different makes, as, owing to the difference in construction in the heads of various bicycles, some luggage-carriers adapted for use upon one style of bicycle would not fit upon any other kind of machine at all, and others would require to be specially bent so as to fit. It will be readily seen, however, that my improved luggage-carrier is equally adapted for use upon machines of the various makes, it being only necessary to engage the hooks B upon the handle-bars and bring the inclined arms down, so as to permit the cross-piece G to be supported upon the brake, as shown, when the strap E may be fastened so as to secure the carrier firmly in position, and to detach the carrier from the machine all that is necessary is to unfasten the strap E, when the carrier may be lifted bodily from the bicycle.

I would have it understood that I do not limit myself to the exact construction shown in the drawings, as the various features of construction might be variously modified without departing from my invention, and any device employing the horizontal arms for sustaining the load and bracket-arms for stiffening the horizontal arms I regard as coming within the scope of my invention.

Having thus described my invention, what I claim as new and useful is—

A luggage-carrier formed of a continuous piece of metal bent so as to form the bracket-arms C, horizontal arms A, and hooks B, and in connection therewith straps for securing the bundle in place upon the carrier, and a strap adapted to engage the brake so as to secure the carrier firmly upon the bicycle, substantially as described.

In testimony whereof I sign this specification in the presence of two witnesses.

CLARENCE H. SMITH.

Witnesses:
HUGUES J. LAVERGNE,
M. C. SONIAT.